Jan. 24, 1961   P. M. CARLSSON ET AL   2,969,277
APPARATUS FOR THE FERMENTATION OF SOLID ORGANIC MATERIALS
Filed May 16, 1957   2 Sheets-Sheet 1
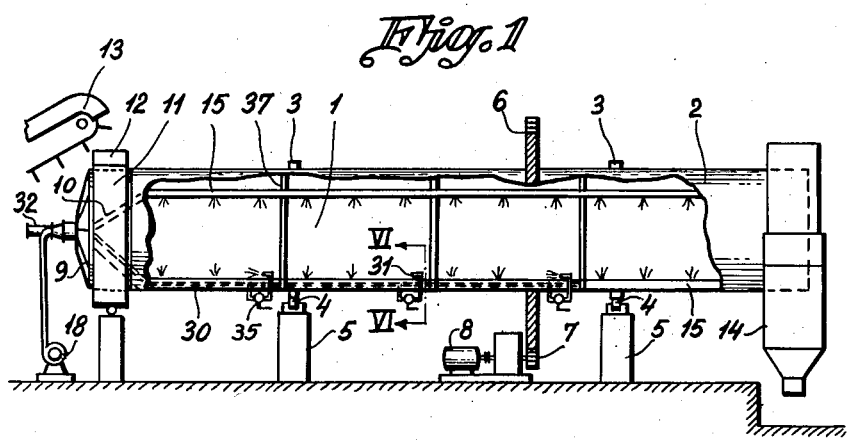
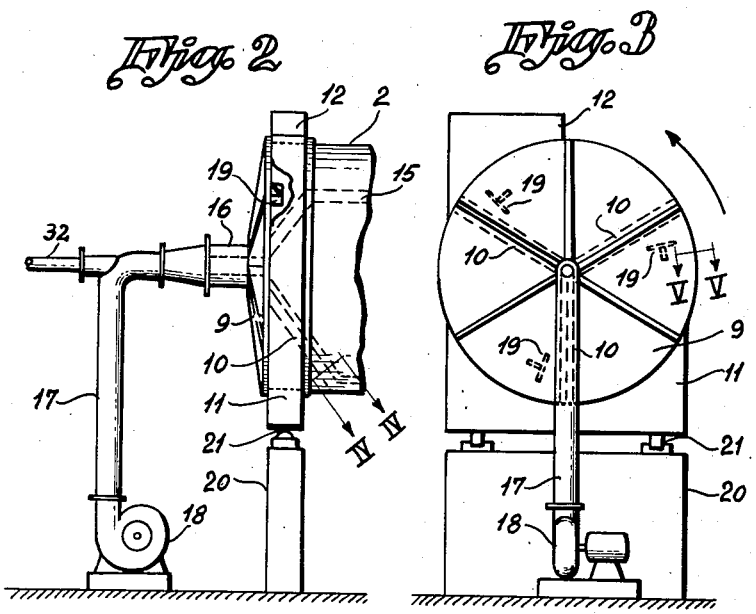
INVENTOR.
BY

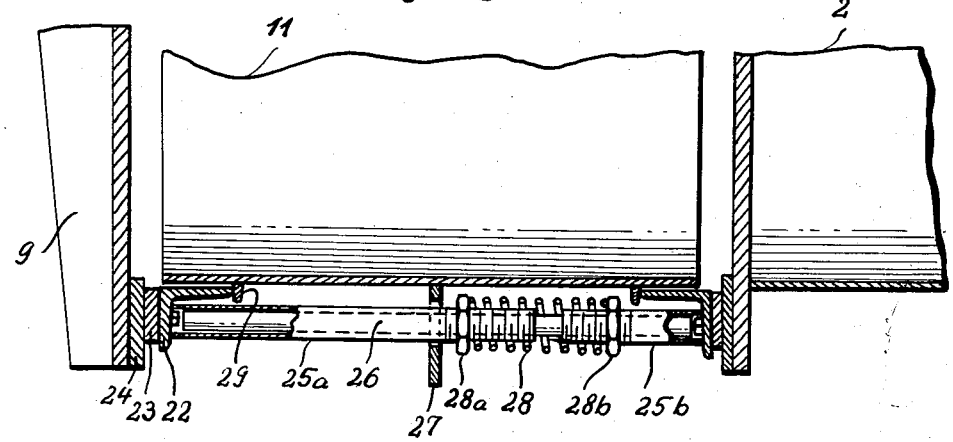
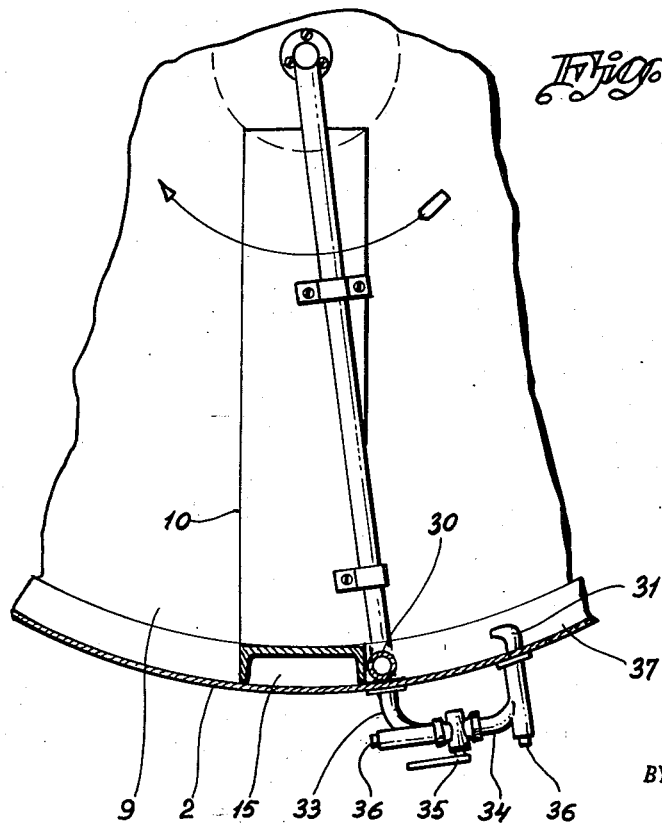

United States Patent Office 2,969,277
Patented Jan. 24, 1961.

2,969,277

APPARATUS FOR THE FERMENTATION OF SOLID ORGANIC MATERIALS

Peter Marius Carlsson, Copenhagen, and Kai Finn Petersen, Rungsted, Kyst, Denmark, assignors to Dano Ingeniorforretning og Maskinfabrik, Ingenior Kai Petersen's Fond, Soborg, Denmark, a Danish body corporate Filed May 16, 1957, Ser. No. 659,592

Claims priority, application Denmark May 17, 1956

8 Claims. (Cl. 23—259.1)

The present invention relates to an apparatus for the fermentation of solid organic materials, particularly organic waste materials, e.g. house refuse and vegetable waste, in a horizontal rotatable container, which is accessible at one of its ends by means of an aperture for the feeding of the materials, and is provided with an end plate at the same end.

The object of the invention is to provide an apparatus, into which the material to be fermented can be safely and effectively fed without risk of wastage, whether the said material exclusively consists of solid components or consists of solid components moistened with liquid, e.g. with sludge.

Apparatuses of the present nature are known, wherein the materials are fed into the container through an end plate, which is stationary in relation to the container shell, e.g. by means of a funnel located on the end plate. This construction has the disadvantage that it is difficult to obtain sufficient tightening between the end plate and the shell, particularly so when the latter is rotating.

Attempts have been made to remedy this disadvantage by mounting the end plate on the container shell, so that it participates in the rotary motion, and feeding the materials through an aperture disposed centrally in the end plate. Conveying devices, particularly conveyer worms, have been used for feeding the materials through the aperture. The use of such conveying devices, however, has the disadvantage that they may compress the materials, so that it may become difficult to achieve a uniform fermentation of the whole mass of material. A further disadvantage is that such conveying devices may accidentally crush glass and the like fragile material to an unnecessary degree.

The said disadvantages are avoided by an apparatus designed in accordance with the invention, which is characteristic in that the end plate is so attached to the container that it is spaced from the container shell as seen in the axial direction of the container, and that the feeding aperture is provided in a non-rotatable annular member, which bridges the space thus formed between the shell and the end plate.

Thus, the end plate participates in the rotary motion of the container, but the material is fed through the annular member, which does not participate in the rotary motion. As the said annular member is disposed between the end plate and the shell, the latter members can restrict an axial displacement of the member, whereby a basis is established for an effective tightening between the annular member and the end plate or the container shell, respectively.

According to the invention the end plate may be connected with the container by means of arms, which from the centre of the end plate incline outwards towards the centainer shell. It is thereby obtained that the feeding of material through the annular member is hampered as little as possible by the members connecting the container and the end plate.

If the apparatus is provided with devices for artificial aeration of the contents of the drum, a simple construction can be obtained according to the invention by the connection of the end plate with the container by means of at least one supply pipe for an aeration medium, the aforesaid arms being in this case completely or partially substituted by such supply pipes.

In the latter case the supply pipe will emanate from the centre of the end plate, whereby a possibility is obtained of a simple tightening of a connection between the supply pipe or pipes and a stationary main pipe for aeration medium.

According to the invention the members connecting the end plate and the container may have a substantially triangular section with an edge facing the annular member. Thereby a basis has been established for the connecting members to have inclined faces in relation to the radial line for the container, which said faces partly reduce the risk that parts of the material may happen to stick to the members, partly provide an opportunity for influencing newly fed material, so that it is removed from the feeding aperture as soon as possible.

According to the invention it is expedient that the annular member is so mounted that it can move at least in the direction of the container axis, so that during operation it may yield to displacing influences, if any, in axial direction of the container without losing the tight abutment against the end plate and the container shell. In certain cases, however, it may be an advantage if the annular member is so mounted, that it may also move to some extent in transverse direction of the container axis, still with a view to maintaining an effective tightening between member, end plate, and shell.

According to the invention the annular member may be tightened against the end plate as well as against the container shell by means of tightening faces, which by means of an elastic contact maintaining member are held in abutment against counter faces. By the use of an elastic contact maintaining member it is obtained that the tightening faces of the member can be held in tightening abutment against the counter faces, even in the case of an axial displacement of the member in one or the other direction in relation to the end plate and the container shell.

If the apparatus according to the invention is to be used for the fermentation of solid organic materials while fluid, particularly sludge, is being supplied, which is fed into the container through at least one pipe, the pipe may emanate according to the invention from the said end plate and extend along the container shell and be connected with a number of discharge nozzles, distributed over the length of the container and facing its interior.

According to the invention the said fluid supply pipe may be built together with one of the said arms or one of the said supply pipes for aeration medium. It is thereby obtained in a simple manner that also the fluid supply pipe can emanate from the centre of the end plate, so that also in the case of the fluid supply pipe it is possible to obtain a single and uncomplicated tightening of the connection between the supply pipe and a stationary main pipe for the fluid.

According to the invention the fluid supply pipe may extend along the interior face of the shell and be connected with the discharge nozzles by means of individual branch pipes, which extend from the supply pipe outwards through the shell, some distance along the shell, and back through the shell to the nozzle.

If the fermentation proceeds at increased temperature, it is possible in the case of such an arrangement to preheat the fluid, before it is supplied to the contents of the drum. The positioning and design of the branch pipe indicated herein are prerequisites for a convenient cleaning of the nozzles.

For this purpose cleaning doors may be provided according to the invention in the branch pipe. In addition to the cleaning of the nozzles the doors may also be used for cleaning the branch pipe itself or even for cleaning the very supply pipe.

According to the invention a stop valve can be incorporated in the branch pipe, whereby it is made possible to open and close each nozzle separately from without.

Depending upon the character of the solid materials and the quantity of fluid supplied, it may happen that the fluid will not immediately be absorbed by the materials, but only gradually when the components of the materials are brought into contact with the fluid through the rotary motion. Therefore, non-absorbed fluid may happen to collect on the bottom of the container, which is particularly inconvenient, when the container has a somewhat inclined position, e.g. in order to further the axial travel of the materials through the container, seeing that the free fluid will then run towards the discharge end of the container, whereby the finished material, which is preferred to be dry, is undesirably moistened.

In order to prevent the fluid from passing through the container in its axial direction, there may be provided according to the invention internally on the container shell low stop rings for fluid, protruding from the shell radially towards the interior of the container.

As experience shows that the greater part of free fluid is to be found in proximity to the fluid discharge nozzles, it may be expedient according to the invention to position the stop rings behind the fluid discharge nozzles, as seen from the feeding end of the container.

The invention will now be explained in detail with reference to the drawing, wherein Fig. 1 shows one embodiment of an apparatus according to the invention, partly as seen from the side and partly in section, Fig. 2 is a side view of the feeding end of the apparatus, on a larger scale, Fig. 3 is an end view of the feeding end according to Fig. 2, Fig. 4 is a section on the line IV—IV in Fig. 2, on a larger scale, Fig. 5 shows on a larger scale a tightening arrangement between a non-rotatable annular member disposed between the end plate and the shell of the apparatus, and said plate and said shell, and Fig. 6 shows schematically on a larger scale the positioning of a fluid supply pipe in the apparatus.

The apparatus according to the invention consists of an oblong container 1 in the form of a drum with a casing 2, which constitutes the container shell. The casing is encircled by rails 3, running on rollers 4, which are mounted on supports 5. To the casing 2 there is likewise attached an encircling gear rim 6, engaged by a gear wheel 7, which is connected with a motor 8 via a gearing, so that the container can be rotated about its longitudinal axis by means of the motor 8.

The material to be fermented in the container is intended to travel through the container from the left to the right during the fermentation. For this purpose feeding means have been provided at the left-hand end of the container and discharging means at the right-hand end of the container.

Supply funnel

The container 1 is provided with an end plate 9, which is so attached to the casing 2 by means of arms 10 that it is spaced from the casing 2, as seen in axial direction of the container. A non-rotatable annular member 11 bridges the space thus formed between the casing 2 and the end plate 9. The member 11 is provided with an aperture for the feeding of material, which is surrounded by a funnel 12, see also Fig. 3, which said funnel in the shown embodiment is excentrically disposed on the member 11.

The feeding of material is effected by means of a conveyor belt 13, whereas the fermented material is discharged at the right-side discharge end of the container 1 into a discharge hopper 14, from where the material is delivered, if so desired after having first passed one or more sifters. The discharge hopper and the sifter or sifters constitute no part of the invention.

The shown embodiment of the apparatus is provided with devices for artificial aeration of the contents of the drum. The said devices comprise air supply pipes 15. In the shown embodiment three such pipes have been provided. The pipes 15 extend along the casing 2 and are provided with a proper number of air outflow apertures or air outflow nozzles, so that the aeration medium is supplied to the contents of the drum radially inwards from the container shell.

In the shown embodiment the pipes 15 at their left-side ends are passed in an inclined direction towards the centre of the end plate 9 and constitute the arms 10, which secure the end plate 9.

The pipes 15 unite at the centre of the end plate 9, where they are connected with a main pipe 17, a tightening 16 being coupled in between, which said main pipe is connected to a fan 18. The tightening 16 constitutes no part of the invention.

The section of the left-side inclining parts of the pipes 15 is substantially triangular, see Fig. 4, and the arrangement involves that the pipe apex, which is lowermost in Fig. 4, points toward the inner face of the annular member 11.

On the interior face of the end plate 9 there is placed a number of blades 19, which remove newly charged material from the funnel 12 during the rotation of the end plate.

The invention is not restricted to the shown embodiment, seeing that the pipes 15 instead of extending at their left-side ends in an inclined direction towards the end plate 9 may also extend in a straight direction, until they meet the plate 9. It is not necessary that the pipes 15 simultaneously constitute the arms, as the arms may also be independent members. It is also possible to restrict the number of air supply pipes 15 to one only.

The annular member 11 is based on a support 20, on which the member 11 rests by means of supporting rollers 21. The supporting rollers 21 permit an axial movement of the member 11, insofar the end plate 9 and the casing 2 permit a displacement of the member 11 in the axial direction. The supporting rollers 21 may be substituted by supporting members, which permit a displacement of the annular member 11 in the axial direction as well as transversely thereof.

Tightening

Tightening members, as shown detailed in Fig. 5, are disposed between the member 11 and the end plate 9 or the casing 2, respectively. The tightening is the same on either side of the member 11, for which reason only the tightening between the member 11 and the end plate 9 will be described in the following.

The annular, non-rotatable member 11 carries circumferential angular rails 22, the outwardly protruding flanges of which carrying a tightening covering 23, which abuts against a corresponding covering 24 mounted on the end plate 9. The angular rails 22 are displaceable in the axial direction of the member 11 so that the tightening coverings 23 of the rails may be held in abutment against the coverings 24 also in case the member 11 is axially displaced in relation to the end plate 9.

The coverings 23 and 24 are held in mutual abutment by means of elastic contact maintaining members mounted on the member 11. In the embodiment shown, these members consist of pipes 25a and 25b which are arranged coaxially opposite each other and spaced from each other, as shown in Fig. 5, the pipe 25a being connected with the left angular rail 22, which serves for tightening between the member 11 and the end plate 9, while the right pipe 25b being connected with a corresponding angular rail for tightening between the member 11 and the shell 2. The pipes 25a and 25b are mutually secured against tilting by means of a common bar 26 arranged within said pipes. Furthermore, the pipe 25a is guided on the member 11 by means of a holder 27.

A pressure spring 28 extends between the pipes 25a and 25b, the tension of which may be adjusted by means of nuts 28a and 28b, respectively, which are screwed upon the pipes 25a and 25b, respectively.

For tightening the displacement fissure between the angular rail 22 and the member 11, ribs 29 may be welded upon the member 11. It will be sufficient to arrange such ribs on the lower half-part of the member 11.

Fluid supply

The shown apparatus is also provided with devices for the supply of fluid, particularly of sludge, to the interior of the container.

The fluid supply members, which are shown detailed in Fig. 6, comprise a pipe 30, which is disposed along the casing 2 of the container 1 on the inner face of the casing, and which is connected with discharge nozzles 31 by means of branch pipes. The left-side end of the pipe 30 is bent obliquely upwards towards the centre of the end plate 9, and throughout this length it is attached to an arm 10. The left-side end of the pipe 30 extends through the end plate 9, and beyond same it is connected with a stationary main pipe 32 for fluid supply by means of a suitable tightening.

The pipe 30 may also be located within the air supply pipe 15, at any rate as far as the part of the pipe 15, which extends through the end plate 9, is concerned.

The nozzles 31 are connected with the pipe 30 by means of a branch pipe, which comprises a bend 33 connected with the pipe 30, a bend 34 connected with the nozzle 31, and a stop valve 35 incorporated between the bends 33 and 34 in a part of the branch pipe, which extends virtually along the outer face of the casing 2. The bends 33 and 34 are provided with axial branches, which are closed by means of screw plugs 36, so that the bends and the nozzle 31 can be cleaned, when the screw plugs are removed. The members may also be so arranged that at least part of the pipe 30 can be cleaned out from a branch pipe.

The nozzle shown in Fig. 6 has been turned in the plane of the drawing for clearness, whereas in practice the nozzles point in axial direction of the container. Whether all the nozzles point in the same direction depends upon operational conditions. If a dry discharge product is desired, at least the nozzle disposed farthest to the right in the container is so placed that it points toward the feeding end of the container. In Fig. 1 all nozzles point in this direction.

Low rings 37, which protrude radially towards the interior of the container, have been placed on the inner face of the casing 2, serving as stop rings for fluid which may collect on the bottom of the container. In the shown embodiment one stop ring 37 pertains to each nozzle 31, and the stop rings are so located as to be to the rear of the nozzles 31, as seen from the left-side feeding end of the container.

Working method

Solid organic material is supplied to the container 1 by means of the conveyor belt 13 and the stationary funnel 12. During the rotation of the container 1 the materials are tumbled, at the same time as they gradually move through the container towards its right-side discharge end and leave the container through the discharge hopper 14. During the travel through the container the materials ferment while being artificially aerated, the aeration medium being supplied to the materials from without and inwards by means of the air supply pipe 15. The quantity of air supplied is regulated in accordance with the desired temperature of the fermentation, whereby the fermentation is controlled. If desired, the supplied material can be moistened during the fermentation by means of the nozzles 31, and the supply of fluid can be started, regulated or discontinued by means of the cocks 35. A possibility exists for the fermentation of sludge together with the solid materials, as the temperature developed by the fermentation of the materials can be utilized for evaporation of the moisture contents of the sludge, so that the whole fermentation process in spite of the supply of sludge on the whole proceeds in a solid phase. The positioning of the fluid nozzles 31 makes it possible to divide the interior of the container into individual moistening zones, each zone beginning with a nozzle 31 and ending immediately in front of the next nozzle, as seen in the direction from the left-side feeding end of the container. The fermentation will reach its maximum intensity between the limits of each moistening zone, but on account of increasing desiccation it will to some extent decline towards the succeeding nozzle 31, as seen in the axial travel direction of the materials. A suitable distribution of the nozzles 31 in the longitudinal direction of the container and a suitable measuring of the fluid supply, however, will make it possible to maintain throughout the whole part of the container, where the fermentation proceeds, a condition of moistness, which is on the whole uniform, such a condition being a prerequisite for a uniform fermentation process.

If the material leaving the container has to be dry, it may be expedient to supply comparatively much aeration medium in proximity to the right-side discharge end of the container, so that a drying zone is established for the processed material. In order not to have the drying disturbed by fluid, which may have collected on the bottom of the container and tends to flow towards the discharge end of the container, the last stop ring 37, i.e. the one positioned farthest to the right, is suitably placed not farther than the beginning of the drying zone, as seen in the axial travel direction of the materials, so that fluid sprayed from the nozzle 31, placed farthest to the right, cannot run into the drying zone either.

It will be understood that the stop rings 37 form barriers for free fluid, i.e. fluid that has not yet been absorbed by the solid material constituents. The rings work as fluid stemming members, so that the constituents of the solid materials with the rotation of the container are allowed to obtain contact with the fluid and gradually absorb same, whereby it will be possible to obtain a uniform moistening of all the mass of material fed into the container.

Having thus fully described our invention we claim as new and desire to secure by Letters Patent:

1. Apparatus for making compost from non-fluid waste materials containing fermentable organic substances, which comprises a solid walled elongated container, said container comprising a shell, an end plate for closing said container at one end thereof, connecting means between said end plate and said shell, secured to the peripheral wall of said shell and to said end plate for securing said plate to said shell, said connecting means having a considerable length so as to hold the said end plate in spaced relationship with respect to the neighboring end of said shell in the axial direction of said container, means for mounting said shell together with said end plate for rotation about a horizontally disposed axis, a cylindrical ring member being positioned in the space between said shell and said end plate in substantially coaxial relationship with respect to said shell and said plate, means for mounting said cylindrical ring member non-rotatably in said position, the said cylindrical ring member having a diameter substantially equal to the diameter of said shell and a length substantially equal to the axial length of said space, a feeding opening for said materials arranged in the peripheral wall of the said cylindrical ring member in the upper half-part thereof with respect to the axis of rotation of said container, and discharge means at the opposite end of said container from said feeding opening.

2. Apparatus for making compost from non-fluid waste materials containing fermentable organic substances, which comprises a solid walled elongated container, said container comprising a shell, an end plate for closing said container at one end thereof, connecting arms between said end plate, and said shell for securing said end plate to said shell, said connecting arms at one end being secured to said end plate at the center portion thereof and inclining outwardly therefrom towards said shell and being secured to the peripheral wall of said shell at their opposite ends, said arms having a considerable length so as to hold said end plate in spaced relationship with respect to the neighboring end of said shell in the axial direction of said container, means for mounting said shell together with said end plate for rotation about a horizontally disposed axis, a cylindrical ring member positioned in the space between said shell and the said end plate in substantially coaxial relationship with respect to said shell and said plate, means for mounting said cylindrical ring member non-rotatably in said position, the said cylindrical ring member having a diameter substantially equal to the diameter of said shell and a length substantially equal to the axial distance between said shell and said end plate, a feeding opening for said materials arranged in the peripheral wall of the said cylindrical ring member in the upper half-part thereof with respect to the axis of rotation of said container, and discharge means at the opposite end of said container from said feeding opening.

3. Apparatus for making compost from non-fluid waste materials containing fermentable organic substances, which comprises a solid walled elongated container comprising a shell, aeration medium injecting means arranged at the peripheral wall of said shell for the injection of aeration medium to the interior of said container, an end plate for closing said container at one end thereof, connecting means between said end plate and said shell, secured to the peripheral wall of said shell and to said end plate for securing said plate to said shell, said connecting means having a considerable length so as to hold the said end plate in spaced relationship with respect to the neighboring end of said shell in the axial direction of said container, at least one of said connecting means being a pipe, said pipe being connected with the said aeration medium injecting means at one end and with a source of aeration medium under pressure at the opposite end, means for mounting said shell, said end plate, said connecting means and said injecting means together for rotation about a horizontally disposed axis, a cylindrical ring member positioned in the space between said shell and the said end plate in substantially coaxial relationship with respect to said shell and said plate, means for mounting said cylindrical ring member non-rotatably in said position, the said cylindrical ring member having a diameter substantially equal to the diameter of said shell and a length substantially equal to the axial distance between said shell and the said plate, a feeding opening for said materials arranged in the peripheral wall of the said cylindrical ring member in the upper half-part thereof with respect to the axis of rotation of said container, and discharge means at the opposite end of the container.

4. Apparatus for making compost from non-fluid waste materials containing fermentable organic substances, which comprise a solid walled elongated container comprising a shell, aeration medium injecting means arranged at the peripheral wall of said shell for the injection of aeration medium to the interior of said container, an end plate for closing the container at one end thereof, connecting means between said end plate and said shell secured to the peripheral wall of the shell and to said end plate for securing said plate to said shell, said connecting means having a considerable length so as to hold the said end plate in spaced relationship with respect to the neighboring end of the said shell in the axial direction of said container, means for mounting said shell, said end plate, and the said connecting means together for rotation about a horizontally disposed axis, a cylindrical ring member positioned in the space between said shell and the said end plate in substantially coaxial relationship with respect to said shell and said plate, means for mounting said cylindrical ring member non-rotatably in said position, said cylindrical ring member having a diameter substantially equal to the diameter of said shell and a length substantially equal to the axial distance between said shell and said end plate, a feeding opening for said materials arranged in the peripheral wall of the said cylindrical ring member in the upper half-part thereof with respect to the axis of rotation of said container, said connecting means extending through the interior of said cylindrical ring member and being of substantially triangular cross-section with one apex of the triangle being directed radially outwardly towards the peripheral wall of the said cylindrical ring member, and discharge means at the opposite end of the container.

5. Apparatus for making compost from non-fluid waste materials containing fermentable organic substances, which comprises a solid walled elongated container comprising a shell, fluid admission means arranged at the peripheral wall of said shell for the admission of fluid to the interior of said container, and end plate for closing said container at one end thereof, connecting means between said end plate and said shell secured to said peripheral wall of said shell and to said end plate for securing said plate to said shell, said connecting means having a considerable length so as to hold the said end plate in spaced relationship with respect to the neighboring end of said shell in the axial direction of the container, a fluid supply pipe for said fluid admission means, said pipe being secured to said connecting means, means for mounting said shell, said end plate, said connecting means and said fluid admission means together for rotation about a horizontally disposed axis, a cylindrical ring member positioned in the space between the shell and the said end plate in substantially coaxial relationship with respect to said shell and said plate, means for mounting said cylindrical ring member non-rotatably in said position, the said cylindrical ring member having a diameter substantially equal to the diameter of said shell and a length substantially equal to the axial distance between said shell and siad end plate, a feeding opening for said materials arranged in the peripheral wall of the said cylindrical ring member in the upper half-part thereof with respect to the axis of rotation of said container, and discharge means at the opposite end of the container from said feeding opening.

6. Apparatus for making compost from non-fluid waste materials containing fermentable organic substances, which comprises a solid walled elongated container comprising a shell, fluid admission means arranged at the peripheral wall of said shell for the admission of fluid to the interior of the container, an end plate for closing said container at one end thereof, connecting means between said end plate and said shell secured to the peripheral wall of said shell and to said end plate for securing said plate to said shell, said connecting means having a considerable length so as to hold the said end plate in spaced relationship with respect to the neighboring end of the shell in the axial direction of the container, a fluid supply pipe for said fluid admission means, said pipe being secured to said connecting means, a connecting pipe between said fluid supply pipe and said fluid admission means, said connecting pipe extending from said supply pipe a distance along the inner surface of said peripheral wall of said shell, outwardly through said wall, a distance along the outside of said wall, and again inwardly through said wall to said fluid admission means, at least one cleaning door arranged in that portion of said connecting pipe extending along the outside of said wall of said shell, means for mounting said shell, said end plate, said connecting means and said fluid supply means together for rotation about a horizontally disposed axis, a cylindrical ring member positioned in the space between said shell and said end plate in substantially coaxial relationship with respect to said shell and said plate, means for mounting said cylindrical ring member non-rotatably in said position, the said cylindrical ring member having a diameter substantially equal to the diameter of said shell and a length substantially equal to the axial distance between said shell and said end plate, a feeding opening for said materials arranged in the peripheral wall of the said cylindrical ring member in the upper-half part thereof with respect to the axis of rotation of said container, and discharge means at the opposite end of the container from said feeding opening.

7. Apparatus for making compost from non-fluid waste materials containing fermentable organic substances, which comprises a solid walled elongated container comprising a shell, fluid admission means arranged at the peripheral wall of said shell for the admission of fluid to the interior of the container, an end plate for closing said container at one end thereof, connecting means between said end plate and said shell secured to the peripheral wall of said shell and to said end plate for securing said plate to said shell, said connecting means having a considerable length so as to hold the said end plate in spaced relationship with respect to the neighboring end of said shell in the axial direction of said container, a fluid supply pipe for said fluid admission means, said pipe being secured to said connecting means, a connecting pipe between said fluid supply pipe and said fluid admission means, said connecting pipe extending from said supply pipe a distance along the inner surface of the peripheral wall of said shell, outwardly through said wall, a distance along the outside of said wall, and again inwardly through said wall to said fluid admission means, a control valve incorporated in that portion of the connecting pipe extending along the outside of said wall of said shell, means for mounting said shell, said end plate, said connecting means and said fluid supply means together for rotation about a horizontally disposed axis, a cylindrical ring member positioned in the space between said shell and said end plate in substantially coaxial relationship with respect to said shell and said plate, means for mounting said cylindrical ring member non-rotatably in said position, said cylindrical ring member having a diameter substantially equal to the diameter of said shell and a length substantially equal to the axial distance between said shell and said end plate, a feeding opening for said materials arranged in the peripheral wall of the said cylindrical ring member in the upper half-part thereof with respect to the axis of rotation of said container, and discharge means at the opposite end of the container from said feeding opening.

8. Apparatus for making compost from non-fluid waste materials containing fermentable organic substances, which comprises a solid walled elongated container comprising a shell, a feeding opening at one end of said container, fluid admission means arranged at the peripheral wall of said shell for the admission of fluid to the interior of the container, circumferential annular stop members arranged on the inner surface of said peripheral wall of said shell at a distance from the ends thereof and secured to said wall, said stop members extending a distance radially inwardly from said wall so as to serve as stop members for admitted fluid at the inner periphery of said shell for preventing fluid from running all along the peripheral wall thereof, the said stop members being arranged behind said fluid admission means when viewed from the feeding end of the container in the axial direction thereof, an end plate for closing the container at one end thereof, connecting means between said end plate and said shell secured to the peripheral wall of the shell and to said end plate for securing said plate to the shell, said connecting means having a considerable length so as to hold the said end plate in substantially spaced relationship with respect to the neighboring end of said shell in the axial direction of said container, a fluid supply pipe for the said fluid admission means, said pipe being secured to said connecting means, means for mounting said shell, and said end plate, for rotation together about a horizontally disposed axis, a cylindrical ring member positioned in the space between said shell and the said end plate in substantially coaxial relationship with respect to said shell and said plate, means for mounting said cylindrical member non-rotatably in said position, said cylindrical ring member having a diameter substantially equal to the diameter of said shell and a length substantially equal to the axial length of the space between said shell and said end plate, the said feeding opening for said materials being arranged in the peripheral wall of the said cylindrical ring member in the upper half-part thereof with respect to the axis of rotation of said container, and discharge means at the opposite end of said container from said feeding opening.

References Cited in the file of this patent

UNITED STATES PATENTS

| | | |
|---|---|---|
| 2,111,783 | Hults | Mar. 22, 1938 |
| 2,287,756 | Hardesty et al. | June 23, 1942 |
| 2,370,614 | Bahm | May 6, 1945 |
| 2,517,470 | Erisman | Aug. 1, 1950 |
| 2,729,554 | Nielsson | Jan. 3, 1956 |